United States Patent [19]

Fukuda et al.

[11] 4,361,288

[45] Nov. 30, 1982

[54] ROTATING SPEED DETECTING DEVICE OF A ROTARY TYPE ELECTROSTATIC SPRAY PAINTING DEVICE

[75] Inventors: Daiki Fukuda, Susono; Teru Morishita, Shizuoka; Toshikazu Suzuki, Toyota, all of Japan

[73] Assignee: Toyota Jidosha Kogyo Kabushiki Kaisha, Toyota, Japan

[21] Appl. No.: 188,214

[22] Filed: Sep. 17, 1980

[30] Foreign Application Priority Data

Apr. 4, 1980 [JP] Japan ............................... 55-43448

[51] Int. Cl.³ .............................................. B05B 5/04
[52] U.S. Cl. ................................. 239/703; 239/223; 324/174
[58] Field of Search .............. 324/173, 174; 239/690, 239/700–703, 214, 223, 224

[56] References Cited

U.S. PATENT DOCUMENTS

| | | | |
|---|---|---|---|
| 3,063,642 | 11/1962 | Point | 239/15 |
| 3,083,911 | 4/1963 | Griffiths | 239/15 |
| 3,121,533 | 2/1964 | Sedlacsik, Jr. | 239/15 |
| 3,128,045 | 4/1964 | Gauthier | 239/15 |
| 3,130,066 | 4/1964 | Brady | 117/93.43 |
| 3,155,539 | 11/1964 | Juvinall | 118/11 |
| 3,248,606 | 4/1966 | Fraser | 317/3 |
| 3,281,076 | 10/1966 | Burnside et al. | 239/7 |
| 3,465,327 | 9/1969 | Schröter et al. | 324/174 X |
| 3,504,851 | 4/1970 | Demeter | 239/15 |
| 3,512,502 | 5/1970 | Drum | 118/624 |
| 3,745,461 | 7/1973 | Wakamatsu et al. | 324/174 |
| 3,873,024 | 3/1975 | Probst | 239/15 |

FOREIGN PATENT DOCUMENTS

| | | | |
|---|---|---|---|
| 2374963 | 8/1978 | France | 239/700 |
| 637311 | 5/1950 | United Kingdom | 324/174 |

Primary Examiner—Andres Kashnikow
Attorney, Agent, or Firm—Kenyon & Kenyon

[57] ABSTRACT

A rotating speed detecting device of a rotary type electrostatic spray painting device comprising an annular permanent magnet fixed onto the rotary shaft of the spray painting device, and a detecting head mounted on the housing of the spray painting device. The detecting head has an induction coil enclosed by electrically insulating material.

6 Claims, 7 Drawing Figures

ROTATING SPEED DETECTING DEVICE OF A ROTARY TYPE ELECTROSTATIC SPRAY PAINTING DEVICE

BACKGROUND OF THE INVENTION

The present invention relates to a rotating speed detecting device of a rotary type electrostatic spray painting device.

The speed of rotation of a rotary shaft is normally detected by sensing a change in the reluctance of a magnetic circuit which is formed between an electromagnetic pick-up and a nut screwed onto the rotary shaft, or between an electromagnetic pick-up and a spacer fixed onto the rotary shaft. The sensing function is performed by the electromagnetic pick-up. However, it is necessary in such known systems to arrange the electromagnetic pick-up at a position near the nut or the spacer. Consequently, situations where a large space cannot be provided around the rotary shaft, such as in a rotary type electrostatic spray painting device, it is difficult to detect the rotating speed of a rotary shaft by using such an electromagnetic pick-up. In addition, in order to use an electromagnetic pick-up in a rotary type electrostatic spray painting device to which a negative high voltage is applied, it is necessary to enclose the electromagnetic pick-up with an electrical insulating material so that the negative high voltage does not have an adverse effect on the output signal. However, enclosing the electromagnetic pick-up causes its size to become even larger. Consequently, it is difficult to arrange an electromagnetic pick-up at a position near the rotary shaft of a rotary type electrostatic spray painting device, and it is therefore difficult to detect the rotating speed of the rotary shaft by using such a conventional electromagnetic pick-up.

It is, therefore, an object of the present invention to provide a rotating speed detecting device which is suited for a rotary type electrostatic spray painting device to which a negative high voltage is applied.

SUMMARY OF THE INVENTION

According to the present invention, a rotating speed detecting device for a rotary type electrostatic spray painting device of the type having a housing and a rotary shaft arranged in said housing is provided with an annular permanent magnet which is fixed onto the rotary shaft and arranged coaxially with a rotation axis therefore. A detecting head which is mounted on the housing is arranged to be radially spaced from the rotary shaft, and contains an induction coil enclosed by electrically insulating material. The induction coil produces an output signal which corresponds to the rotating speed of the rotary shaft.

The present invention may be more fully understood from the detailed description of a preferred embodiment of the invention, set forth below, together with the accompanying drawings.

DETAILED DESCRIPTION OF A PREFERRED EMBODIMENT

Figure 1:
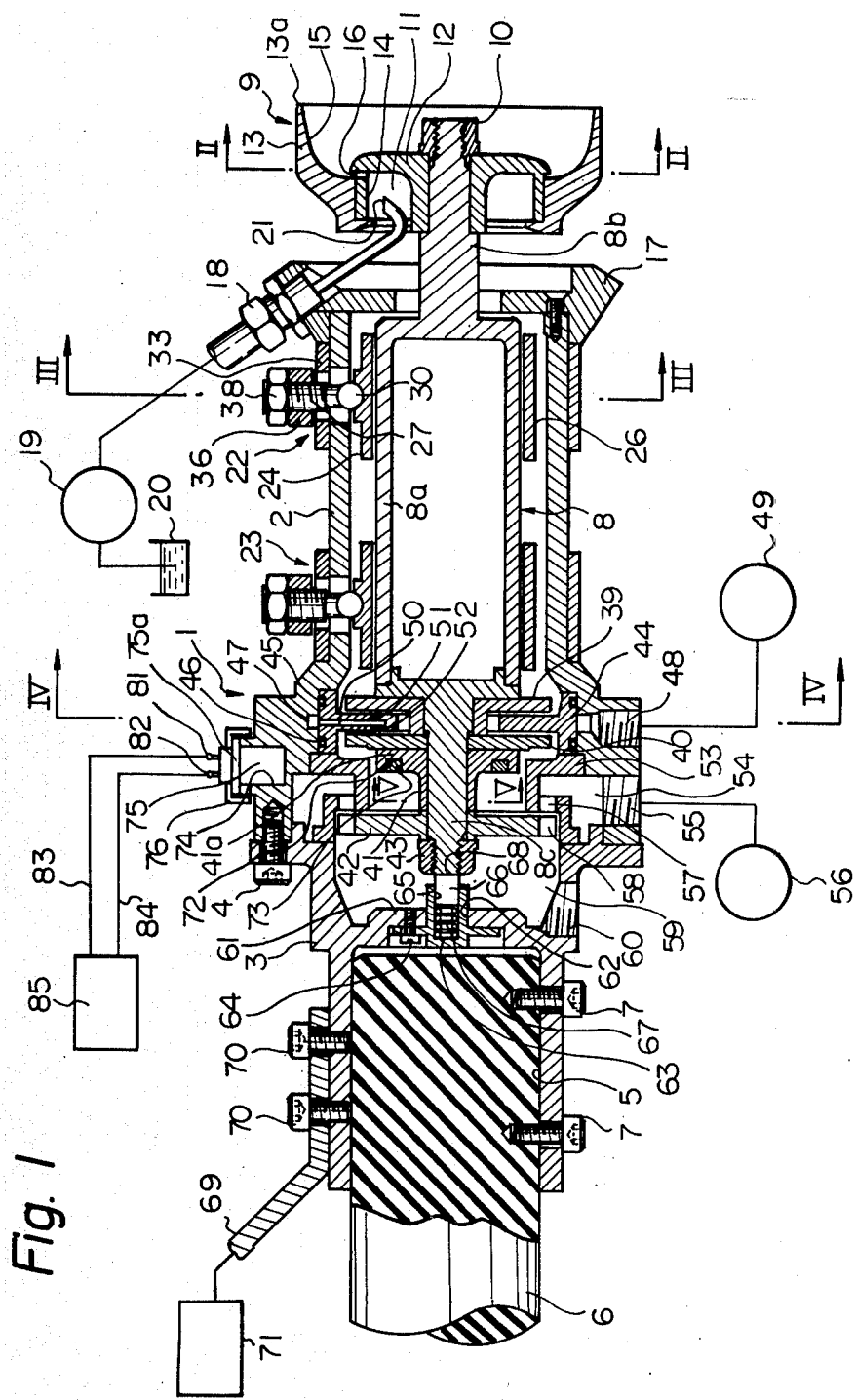
FIG. 1 is a cross-sectional side view of a rotary type electrostatic spray paint device equipped with a rotating speed detecting device according to the present invention.
Figure 2:
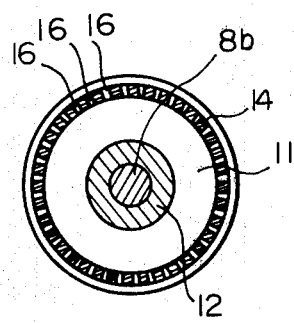
FIG. 2 is a cross-sectional view taken along the line II—II in FIG. 1.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod 6, made of electrical insulating material, is fitted into a cylindrical hole 5 formed in the rear housing 3, and this rear housing 3 is fixed onto the support rod 6 by bolts 70. The support rod 6 is supported by a base (not shown). A rotary shaft 8 is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and being smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
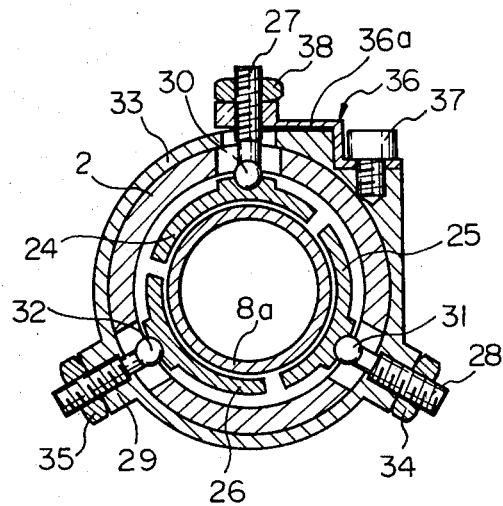
FIG. 3 is a cross-sectional view taken along the line III—III in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 arranged to be spaced from the outer circumferential wall of the hollow cylindrical portion 8a of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36a is fixed onto the bearing support frame 33 by means of a bolt 37, and the other end of the support arm 36 is fixed onto the support pin 27 by means of a nut 38. Consequently, the pad 24 is urged onto the hollow cylindrical portion 8a of the rotary shaft 8 due to the resilient force of the support arm 36.

In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called "wedge effect" of air, and therefore, the pressure of the air between the hollow cylindrical portion 8a and the pads 24, 25, 26 is increased. As a result of this, the force which radially supports the rotary shaft 8 is generated between the hollow cylindrical portion 8a and the pads 24, 25, 26.

Figure 4:
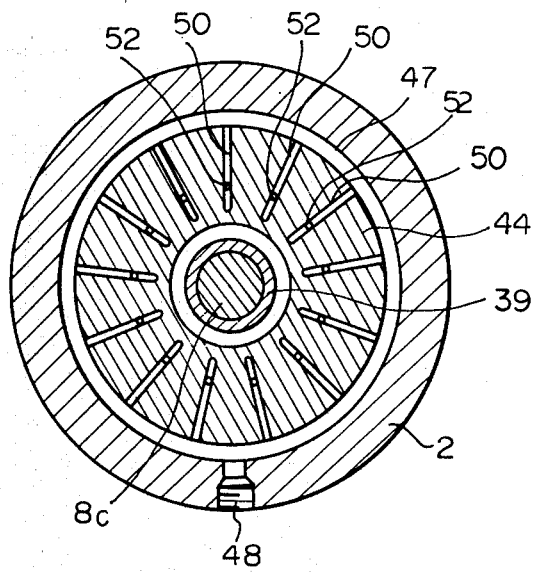
FIG. 4 is a cross-sectional view taken along the line IV—IV in FIG. 1.

Turning to FIG. 1, a pair of disc shaped runners 39, 40 is inserted into the shaft portion 8c of the rotary shaft 8 and fixed onto the shaft portion 8c via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is arranged to be spaced from the annular plate 44 by a slight distance. The annular plate 44 is fixed onto the front housing 2 via a pair of O-rings 45, 46. As illustrated in FIGS. 1 and 4, an annular groove 47, extending along the outer circumferential wall of the annular plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51, each extending towards the runner 40 from the inner end portion of the corresponding air passage 50, is formed in the annular plate 44, and a plurality of air outflow bores 52, each extending towards the runner 39 from the inner end portion of the corresponding air passage 50, is formed in the annular plate 44. In this thrust air bearing, compressed air is fed into the air passages 50 from the air feed pumps 49 via the annular groove 47. Then, the compressed air is injected from the air outflow bores 51 into the clearance between the annular plate 44 and the runner 40 and also injected from the air outflow bores 52 into the clearance between the annular plate 44 and the runner 39. As a result of this, the pressure, which is necessary to maintain the above-mentioned clearances formed on each side of the annular plate 44, is generated between the annular plate 44 and the runners 39, 40.

As illustrated in FIG. 1, a turbine nozzle holder 53 is fixed onto the front housing 2 at a position adjacent to the annular plate 44, and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60.

A through-hole 62 is formed on an end wall 61 of the rear housing 3, which defines the housing interior chamber 59, and an electrode holder 63 extending through the through hole 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8c of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from −60 kV to −90 kV. Consequently, the negative high voltage is applied to both the front housing 2 and the rear housing 3, and it is also applied to the spray head 9 via the electrode 66 and the rotary shaft 8.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, a negative high voltage is applied to the spray head 9. Consequently, when the paint is sprayed from the tip 13a of the spray head body 13 in the form of fine particles, the particles of the sprayed paint are charged with electrons. Since the surface to be painted is normally grounded, the paint particles charged with electrons are attracted towards the surface to be painted due to electrical force and, thus, the surface to be painted is painted.

Figure 5:
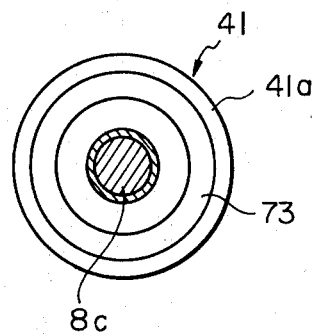
FIG. 5 is a cross-sectional view taken along the line V—V in FIG. 1.
Figure 6:
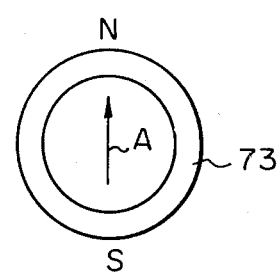
FIG. 6 is a front view of an annular permanent magnet.

Referring to FIGS. 1 and 5, the spacer 41, inserted between the turbine wheel 42 and the runner 40, has an annular flange portion 41a, and an annular permanent magnet 73 is fitted into an annular groove 72 formed on the annular flange portion 41a. As illustrated in FIG. 6, the annular permanent magnet 73 is magnetized in the direction illustrated by the arrow A. Consequently, in FIG. 6, the polarity of the upper portion of the annular permanent magnet 73 is "N", and the polarity of the lower portion of the annular permanent magnet 73 is "S". As illustrated in FIG. 1, a cylindrical bore 74 is formed on the front housing 2 at a position located above the annular permanent magnet 73, and a rotating speed detecting head 75 is fitted into the cylindrical bore 74. The detecting head 74 has an annular flange 75a formed in one piece thereon, and the annular flange 75a is secured onto the front housing 2 by means of a nut 76.

Figure 7:
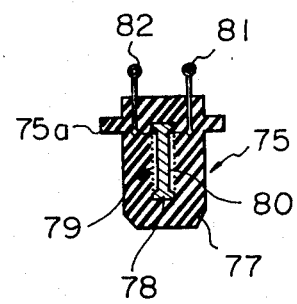
FIG. 7 is a cross-sectional side view of a detecting head.

As illustrated in FIG. 7, the detecting head 75 comprises a body 77 made of an electrical insulating material, such as hard polyvinyl chloride, a bobbin 78 made of magnetic material, an electrical wire 80 wound around the bobbin 78 for forming an induction coil 79, and a pair of external terminals 81, 82. One end of the wire 80, wound around the bobbin 78, is connected to the external terminal 81, and the other end of the wire 80 is connected to the external terminal 82. As illustrated in FIG. 1, the external terminals 81 and 82 are connected to a frequency detector 85 via leads 83 and 84, respectively. When the rotary shaft 8 rotates and, accordingly, the annular permanent magnet 73 rotates, a rotating field generates around the permanent magnet 73. The generation of the rotating field causes the induction coil 79 to generate an induced electromotive force and, as a result, a sinusoidal voltage, having a frequency which is proportional to the rotating speed of the rotary shaft 8, is produced between the external terminals 81 and 82. This sinusoidal voltage is applied to the frequency detector 85 and, thus, the rotating speed can be detected.

As mentioned above, since the rotating field, generated by the annular permanent magnet 73, is detected by the detecting head 75, the spacer 41, the turbine nozzle holder 53 and the front housing 2, which are arranged around the annular permanent magnet 73, are formed of non-magnetic metallic material so that they do not shield the rotating field. In addition, as mentioned above, a negative high voltage of $-60$ KV to $-90$ KV is applied to the front housing 2. Therefore, the body 77 has a thickness of about 5 mm to 15 mm so that the negative high voltage does not influence the induction coil 79 within the detecting head 75. However, since the detecting head 75 is formed by directly covering the bobbin 78, having a small size, by the body 77 made of electrical insulating material, the size of the detecting head 75 becomes rather small.

According to the present invention, since the detecting head detects the rotating field generated by the permanent magnet, it is not necessary to arrange the detecting head at a position near the rotary shaft for detecting the rotating speed of the rotary shaft. Consequently, the detecting head according to the present invention is suited for a rotary type electrostatic spray painting device in which a large space is not present around the rotary shaft. In addition, in a rotary type electrostatic spray painting device, in the case wherein the detecting head is attached to the housing of the device, it is necessary to insulate the detecting head from the housing of the device. However, in the present invention, since the detecting head has such a construction that an induction coil, having a small size, is directly covered by electrical insulating material, the size of the detecting head becomes rather small and, thus, there is an advantage that the detecting head can be easily attached to the housing of a spray painting device.

While the invention has been described by reference to a specific embodiment chosen for purposes of illustration, it should be apparent that numerous modifications could be made thereto by those skilled in the art without departing from the spirit and scope of the invention.

We claim:

1. A rotating speed detecting device for a rotary-type electrostatic spray painting device having a housing and a rotary shaft arranged in the housing, the detecting device further comprising:
    an annular member fixed on the rotary shaft and having an annular groove formed therein, said annular groove being arranged concentrically about an axis of rotation of the rotary shaft;
    an annular permanent magnet fixed into said annular groove and arranged concentrically about said axis of rotation of the rotary shaft; and
    a detecting head mounted on the housing and arranged to be radially spaced from said annular permanent magnet, said detecting head having a cylindrical body made of an insulating material, said cylindrical body having embedded therein an induction coil, enclosed by said electrically insulating material, for producing an output signal representing the speed of rotation of the rotary shaft.

2. A rotating speed detecting device as claimed in claim 1, wherein said annular member is a spacer arranged between a turbine wheel and a runner of the spray painting device.

3. A rotating speed detecting device as claimed in claim 1, wherein said cylindrical body is made of hard polyvinyl chloride.

4. A rotating speed detecting device as claimed in claim 1, wherein said cylindrical body has a thickness of about 5 mm to 15 mm.

5. A rotating speed detecting device as claimed in claim 3, wherein said induction coil comprises a bobbin made of magnetic material, and an electrical wire wound around said bobbin.

6. A rotating speed detecting device as claimed in claim 3, wherein said detecting head is fitted into a bore formed on an outer wall of said housing.

* * * * *

UNITED STATES PATENT AND TRADEMARK OFFICE
CERTIFICATE OF CORRECTION

PATENT NO. : 4,361,288
DATED : November 30, 1982
INVENTOR(S) : Daiki Fukuda, et al It is certified that error appears in the above—identified patent and that said Letters Patent is hereby corrected as shown below:

Col. 1, line 20, after "consequently" insert --in--.

Col. 1, line 50, change "therefore" to --thereof--.

Col. 5, line 3, change "74" to --75--.

Col. 6, line 45, change "1" to -- 3 --.

Signed and Sealed this

First Day of March 1983

[SEAL]

Attest:

GERALD J. MOSSINGHOFF

Attesting Officer    Commissioner of Patents and Trademarks